July 23, 1963

C. F. KADAS 3,098,541

LUBRICATING TOOL

Filed Nov. 7, 1961

INVENTOR
CHARLES F. KADAS

BY *Beale and Jones*

ATTORNEYS

United States Patent Office 3,098,541
Patented July 23, 1963

3,098,541
LUBRICATING TOOL
Charles F. Kadas, Oceana, Va.
(P.O. Box 3097, Oceana Station, Virginia Beach, Va.)
Filed Nov. 7, 1961, Ser. No. 150,699
6 Claims. (Cl. 184—1)

This invention relates to lubricating tools and more particularly to a tool for lubricating a standard roller bearing by a conventional lubricating gun or grease gun.

Many roller bearings have an annular slot in each of their sides which communicates with the annular space between the inner and outer races of the bearing, i.e., the space occupied by the ball or roller bearings. To lubricate a bearing of this nature the bearing may be disassembled and the individual parts lubricated, or the lubricant may be forced into this annular space under pressure. Manifestly, because of the shape of the slot in the side of the roller bearing, some sort of tool or adapter must be provided for attachment to a lubricating or grease gun if the lubricant is to be forced into the bearing. The instant invention provides a lubricating tool permitting lubrication of a bearing of the type described by the use of a conventional lubricating gun. Further, the lubricating tool of this invention permits the lubrication of these bearings in situ in a machine or other rather inaccessible location.

The lubricating tool of this invention has special application for lubricating the roller bearings of an A.M.F. pinspotter machine. However, it will be realized that the subject of this invention may be used to lubricate roller bearings of the type described in any environment, but it is especially useful when the bearings are of the type described and when they are located in a position which is somewhat inaccessible. The invention is not to be interpreted as limited for use only with a bowling pinspotter machine.

In pinspotting machines of the type mentioned above, a number of roller bearings were provided and these bearings required lubrication quite frequently. Heretofore, it had been necessary to remove these bearings from the machine and lubricate them individually because of their inaccessible position. This procedure was a time consuming operation resulting in long shut-down periods. Additionally, a number of men were required to dismantle the roller bearings from the machine. Obviously, this was an undesirable situation for the users of such machines, and it was especially undesirable when a great number of machines were involved.

Accordingly, it is the principal object of this invention to provide a lubricating tool which will permit the lubrication of roller bearings without disassembling the bearings.

A further object of this invention is the provision of a lubricating tool which will permit roller bearings to be lubricated in situ in a machine or other inaccessible location.

A further object of this invention is the provision of a lubricating tool which will permit a roller bearing not having lubrication fittings to be lubricated by a conventional lubricating or grease gun.

An even further object of this invention is the provision of a lubricating tool which may be manipulated within a relatively small space.

A still further object of this invention is the provision of a lubricating tool which has few parts and which will be extremely durable and inexpensive to manufacture. These and other objects and advantages of the invention will become apparent from the following specification and drawing wherein like numerals refer to similar parts throughout.

Figure 1:
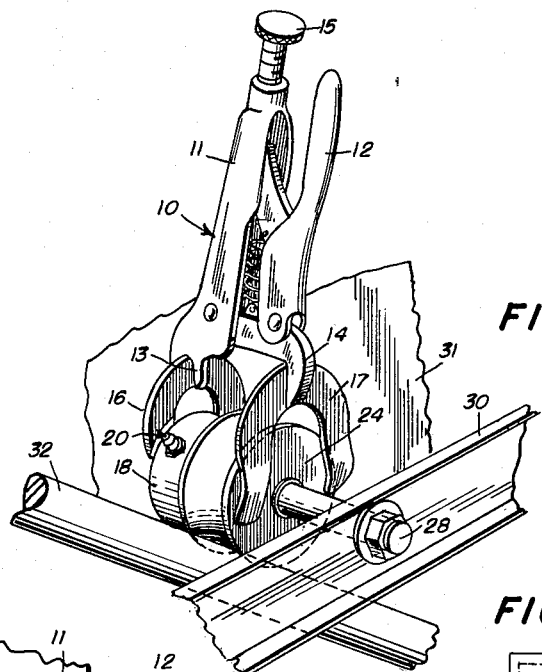
FIGURE 1 is a perspective view of the lubricating tool attached to a roller bearing which is part of a machine.

Briefly, the lubricating tool of this invention includes a plier-like device having first and second parallel, spaced-apart, movable jaws. Secured to the first jaw is a cup member having its rim adapted to engage the side of a roller bearing enclosing the annular lubricant receiving slot therein. Mounted in the wall of the cup member is a lubricant receiving opening or Alemite fitting adapted to be engaged by a conventional grease gun. The roller bearing to be lubricated is clamped between the rim of the cup member and the second of the movable jaws, and a lubricating gun is pressed against the Alemite fitting in the cup member for forcing a lubricant into the bearing.

Referring to the drawing it will be seen that the lubricating tool, generally designated 10, includes handles 11 and 12, and jaw stubs 13 and 14. The handle 12 has an over-center latch arrangement adapting it to snap in place, and this may be adjusted by manipulation of the knob 15. Secured to the jaw stubs 13 and 14 are U-shaped jaws 16 and 17, respectively. The legs of the first jaw 16 are somewhat shorter than the legs of the second jaw 17, and they are attached to the wall of a cup member 18. The cup member 18 has an aperture 19 in its side wall adapted to receive an Alemite fitting or the like 20. The fitting 20 is a part of the tool, and it is permanently mounted in the cup member 18 by any convenient means.

Figures 3, 4:
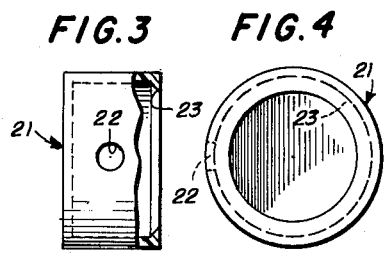
FIGURE 3 is a side view of the sealing means used with the lubricating tool.
FIGURE 4 is a plan view of the sealing means.
Figure 2:
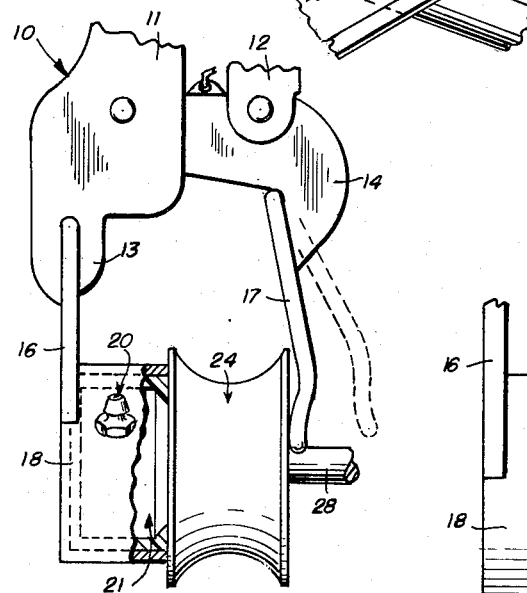
FIGURE 2 is a side view of the lubricating tool attached to a roller bearing.

Often, in some instances while using the lubricating tool of this invention, if the rim of the cup member 18 is uneven or not in a plane parallel with the side wall of the roller bearing, the lubricant under pressure will escape between the periphery of the cup and the roller bearing. Therefore, it has been found desirable to provide sealing means on the cup member where it contacts the side of the bearing. The sealing means used with the lubricating tool of this invention is best seen in FIGURES 3 and 4. It comprises a cup-like insert 21 made of neoprene or other suitable material and it is adapted to be snugly received by the cup member 18. The sealing insert 21 has an aperture 22 in its wall adapted to register with the opening 19 in the cup member. The rim of the insert 21 has a beveled sealing edge 23 which acts to prevent the lubricant from flowing between the rim of the cup member and the bearing. The insert 21 is dimensioned so that the edge 23 extends slightly beyond the rim of the cup 18. When the cup member 18 is clamped against the side of the bearing the edge 23 will be snugly pressed against this wall forming an effective seal.

Figure 5:
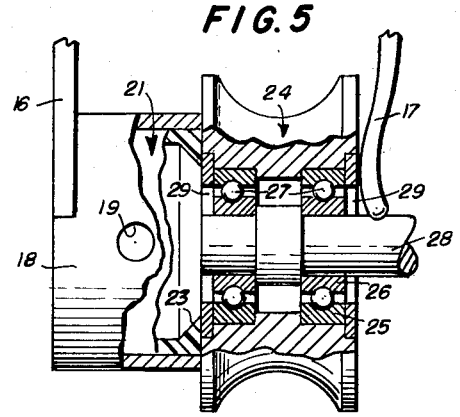
FIGURE 5 is a partial side view and a partial sectional view of the lubricating tool and a roller bearing.

FIGURE 5 shows the lubricating tool of this invention clamped to a roller bearing 24 for lubrication of the same. The bearing includes concentric outer and inner races 25 and 26, respectively, which are spaced apart and adapted to receive a plurality of ball bearings 27. The outer races 25 are fixed to the roller 24, and the inner faces 26 are fixed to a shaft 28. An annular lubricant receiving slot 29 is provided on each side of the roller bearing, and this slot communicates with the annular spaces between the races and with the ball bearings. Thus it can be seen that the bearing 24 is lubricated by clamping the lubricating tool 10 of this invention on the bearing and attaching a lubricating gun to the fitting 20.

The tool is easily clamped to a bearing by centering the cup member over the annular slot 29 and squeezing the handles 11 and 12 until the bearing is snapped between the rim of the cup member and the second jaw 17. The lubricant is forced through the annular slot 29 thereby lubricating the inner and outer races and the individual ball or roller bearings. It will be readily seen that by continued application of pressure by the lubricating gun, the bearing may be flushed, i.e., the old lubricant in the bearing may be forced out of the bearing through the other slot 29 and replaced by the incoming clean lubricant.

FIGURE 1 shows the lubricating tool being used to lubricate a roller bearing in a machine or other rather inaccessible location. In this environment the shaft 28 of the bearing 24 is mounted on a frame member 30 which is closely spaced to a wall 31 (fragmentarily shown) or other obstruction. The bearing 24 is in rolling engagement with a rod 32 adapted for axial movement as indicated by the arrows. Thus it is apparent that the lubricating tool of this invention may be clamped to a bearing when only a small space exists between the outer side of the bearing and the nearest obstruction. The tool is manipulated with respect to the bearing to present the fitting 20 in its most accessible position. Obviously, the cup member 18 may be made more shallow if the tool is to be used in extremely crowded locations.

Thus it can be seen that by this invention a novel lubricating tool has been provided which will permit a standard roller bearing to be lubricated without disassembly of the bearing. Further, the lubricating tool of this invention permits such a bearing to be lubricated when it is in a somewhat inaccessible location.

While this invention has been shown in but a limited number of forms, it is obvious to those skilled in the art that it is not so limited, but it is susceptible of various changes and modifications without departing from the spirit and claims of the invention.

I claim:

1. In combination with a roller bearing having an annular lubricant receiving slot on each side thereof, a lubricating tool comprising bearing gripping means having first and second, spaced-apart, movable jaws, said jaws being relatively thin and planar for fitting into a confined space and pivotally connected for movement with respect to each other, the first of said jaws having a cup member secured thereto with its opening facing the second of said jaws and having its rim engaging the side of said bearing for enclosing the annular slot therein, said cup member having a lubricant receiving aperture in the wall thereof, whereby said bearing may be lubricated by clamping the sides of said bearing between said cup member and said second jaw, respectively, and forcing a lubricant through said lubricant receiving aperture.

2. The lubricating tool according to claim 1 wherein said cup member has sealing means at its rim for forming a seal between said cup member and the side of said bearing.

3. A lubricating tool for a roller bearing having an annular lubricant receiving slot on each side thereof, comprising, bearing gripping means having first and second, generally parallel, spaced-apart, movable jaws, said jaws being relatively thin and planar for fitting into a confined space and pivotally connected for movement with respect to each other, the first of said jaws having a cup member secured thereto with its opening facing the second of said jaws and having its rim adapted to engage the side of said bearing for enclosing the annular slot therein, said cup member having sealing means at its rim and a lubricant receiving aperture in the wall thereof, whereby said bearing may be lubricated by clamping the sides of said bearing between said cup member and said second jaw, respectively, and forcing a lubricant through said lubricant receiving aperture.

4. A lubricating tool according to claim 3 wherein said sealing means includes an annular resilient member at the rim of said cup member for sealing engagement with the side of said bearing.

5. A lubricating tool for a roller bearing having an annular lubricant receiving slot on each side thereof, comprising, bearing gripping means having first and second, generally spaced-apart, movable jaws, said jaws being relatively thin and planar for fitting into a confined space and pivotally connected for movement with respect to each other, the first of said jaws having a cup member secured thereto with its opening facing the second of said jaws and having its rim adapted to engage the side of said bearing for enclosing the annular slot therein, said cup member having a lubricant receiving aperture in the wall thereof, whereby said bearing may be lubricated by clamping the sides of said bearing between said cup member and said second jaw, respectively, and forcing a lubricant through said lubricant receiving aperture.

6. A lubricating tool according to claim 5 including a liner cup in said cup member having an aperture therethrough in alignment with said lubrication receiving aperture, said liner being of resilient material and protruding beyond the open face of said cup for sealing engagement with the side of said bearing.

References Cited in the file of this patent

UNITED STATES PATENTS

| | | |
|---|---|---|
| 2,396,124 | Pitisci | Mar. 5, 1946 |
| 2,656,012 | Thorpe | Oct. 20, 1953 |
| 2,920,518 | La Pointe | Jan. 12, 1960 |